United States Patent [19]

Loren et al.

[11] Patent Number: 4,635,984
[45] Date of Patent: Jan. 13, 1987

[54] VEHICLE BUMPER

[75] Inventors: Norman S. Loren, Warren; William E. Gordon, Sterling Heights, both of Mich.

[73] Assignee: Michael Ladney, Grosse Pointe Shores, Mich.

[21] Appl. No.: 791,501

[22] Filed: Oct. 25, 1985

Related U.S. Application Data

[60] Division of Ser. No. 624,202, Jun. 24, 1984, which is a continuation-in-part of Ser. No. 568,215, Dec. 30, 1983, abandoned.

[51] Int. Cl.[4] ............................................. B60R 19/08
[52] U.S. Cl. .................................................. 293/120
[58] Field of Search ............... 293/120, 109, 136, 121, 293/134; 267/139, 140, 116

[56] References Cited

U.S. PATENT DOCUMENTS

| | | | |
|---|---|---|---|
| 3,494,607 | 2/1970 | Rush | 267/116 |
| 3,666,310 | 5/1972 | Burgess et al. | 293/109 |
| 3,856,613 | 12/1974 | Weller | 293/120 |
| 4,070,052 | 1/1978 | Ng | 293/120 |
| 4,361,352 | 11/1982 | Wakamatsu | 293/120 |
| 4,482,180 | 11/1984 | Huber et al. | 293/120 |

Primary Examiner—Robert R. Song
Attorney, Agent, or Firm—Brooks & Kushman

[57] ABSTRACT

A vehicle bumper is adapted to provide energy management of impact forces. In a basic embodiment the bumper includes a fascia having a front portion adapted to receive impact forces and upper and lower flanges extending rearwardly from the front portion. A backing member is positioned rearwardly from the fascia and includes means for mounting the bumper on the vehicle. The volume bounded by the backing member and the fascia has a resiliently compressible plastic foam molded in situ and features an integral skin bonded to adjacent surfaces of the fascia and the backing member.

10 Claims, 11 Drawing Figures

VEHICLE BUMPER

CROSS REFERENCE TO RELATED APPLICATION

This is a divisional of co-pending application Ser. No. 624,202 filed on June 24, 1984 which is a continuation-in-part of Ser. No. 06-568,215, 12-30-83, now abandoned.

TECHNICAL FIELD

This invention relates to an energy-absorbing bumper for vehicles.

BACKGROUND ART

In recent years various designs of vehicle bumpers have been proposed that are intended to absorb moderate impact forces without damage to the bumper or the vehicle on which it is mounted. One approach has been to use fluid shock-absorbers mounted on the chassis of the vehicle. In the case of bumpers made of plastic, some are in the form of a molded hollow fascia with a molded plastic back-up member or bar linear welded or otherwise secured mechanically to the fascia. In some such bumpers a plastic foam member is inserted between the fascia and the back-up member, the back-up member providing a means for mounting the bumper on the frame of a vehicle. See, e.g. U.S. Pat. Nos. 3,721,433; 3,860,279; 3,866,963, 4,106,804; 4,109,951; 4,116,893; 4,134,610; 4,213,644; 4,268,079; 4,325,574; 4,328,986; 4,350,378; and 4,361,352.

While these and other types of bumpers made wholly or partially of plastic compositions do provide some degree of energy absorption, they are costly to manufacture and assemble, but, in addition, experience has shown that their ability to absorb forces encountered in a relatively moderate impact is, in many instances, insufficient to prevent damage to the bumper or the vehicle.

DISCLOSURE OF THE INVENTION

The present invention has for its primary object the provision of a vehicle bumper capable of absorbing greater impact forces without damage to the bumper or to the vehicle.

Another object of this invention is to provide a shock-absorbing bumper that can be manufactured and assembled economically.

Still another object of this invention is to provide a shock-absorbing bumper with sufficient energy management capability to avoid the need for use of fluid shock absorber devices in some cases.

More specifically, the present contemplates a bumper having a semi-rigid resilient fascia, preferably molded from plastic, and a back-up or mounting member for the bumper spaced from the front face of the fascia, the space therebetween being filled with a resiliently compressible, integral skin plastic foam member molded in situ and integrally bonded to the fascia and the back-up or mounting member. In the bumper of the present invention the increased energy absorption is attributed primarily to the compressibility of the foam core, the adhesion of the integral skin of the foam core to the bumper members and the elongation and tear strength of the integral skin in tension. When a bumper of the present invention is subjected to an impact force, the fascia is deformed and the foam core is compressed. This introduces tension in sections of the foam core and the integral skin. Since the foam is adhered to the bumper elements, this tension tends to inhibit deformation and, thus, increases the energy absorbed by the bumper itself through rearward and lateral distribution of the impact load throughout the bumper.

Another advantage of the present invention is that the bumper maintains its shape and dimensional integrity when heated in a painting process.

Other objects, features and advantages of the present invention will become apparent from the following description and accompanying drawings.

BEST MODE FOR CARRYING OUT THE INVENTION

Figure 1:
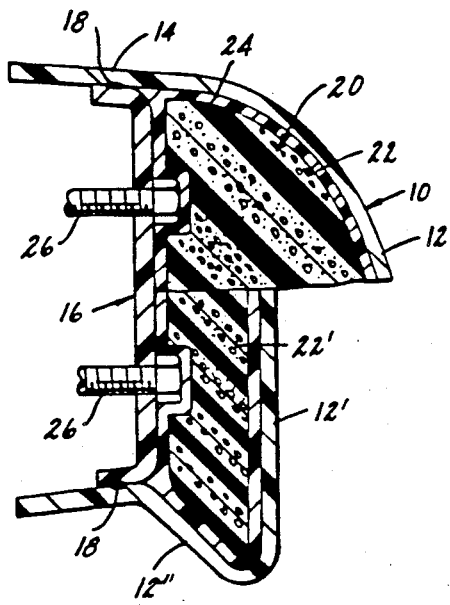
FIGS. 1–5 and 10 are vertical sectional views of various embodiments of bumpers according to the present invention, the upper section of each view showing the bumper components in their normal position and the lower section showing the bumper components in the impacted condition.

Referring to FIG. 1, the bumper there illustrated comprises a fascia member 10 formed to have a generally U-shaped front portion 12 and upper and lower flanges 14 extending rearwardly from the front portion. A bumper bar 16 extends substantially the full length of fascia 10 and is joined to flanges 14, such as by a linear weld, at 18. The volume between the front portion 12 of the fascia 10 and bumper bar 16 comprises plastic foam. The foam is molded in situ by positioning the fascia 10 and the bumper bar 16 in the desired spaced relationship and introducing the foam in the volume which is bounded, in at least substantial part by the fascia and bumper bar. Surface area not bounded by the fascia and bumper bar are bounded by core pieces of shapes selected to provide the desired configuration of the exposed foam areas. The core pieces are pre-treated with mold release materials. A foamable plastic is introduced into the volume and allowed to expand and then cure to a semi-rigid state of desired resilience and compressibility. The foam is preferably a resiliently flexible urethane foam which cures with an integral skin. The interior surfaces of the fascia 10 and the bumper bar 16 may be prepared prior to the introduction of the foamable plastic to enhance bonding. Depending on the materials selected, such surface preparation may involve adhesive application, flame treatment, priming and the like.

Thus, the foam member 20 has a resiliently compressible core 22 and an integral skin 24. Fascia 10 and bumper bar 16 are formed of materials to which the foam member 20 securely adheres when molded therein. The integral skin 24 on the foam core 22 and the tenacious bond between the skin 24 and the adjacent surfaces of members 10 and 16 are critical features of the present invention. As pointed out above, when the bumper is mounted on the frame of a vehicle, such as by the bolts 26, and is subjected to an impact force, the localized area of the fascia where the force is applied deforms generally to the configuration shown in the lower portion of FIG. 1. The central portion of the foam core 22 compresses as indicated at 22' and, since the bumper bar 16 is fixedly secured to flanges 14, the rounded front portion 12 of the fascia 10 is distorted into a flat vertical section 12'. The flattening of the front face causes its upper and lower portions to flare outwardly in a vertical direction as indicated at 12'. The compression of the foam core 22 will absorb a considerable portion of the impact energy, but, at the same time, the energy absorption is increased by the fact that portions of the skin 24 bonded to the fascia 10 are placed in tension. The stretching or elongation of the higher density integral skin 24 absorbs additional impact energy and this tension tends to inhibit deformation of the fascia, thus further increasing the energy absorption. In addition, the tension in the skin tends to return the fascia to its original contour.

Figure 2:
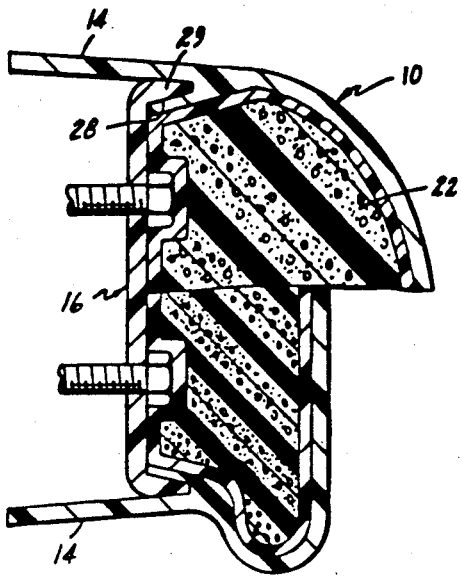

The bumper illustrated in FIG. 2 differs only slightly from that illustrated in FIG. 1 in that the junction between front portion 12 and flanges 14 is formed as a V-shaped notch 28 in which the forwardly extending flanges 29 of the bumper bar are engaged to mechanically interlock fascia 10 and bumper bar 16. This connection serves generally the same function as linear welds 18 in that it prevents the fascia as a whole from shifting rearwardly relative to bumper bar 16 and prevents the flanges 14 from flaring vertically when an impact force is applied to the bumper. However, in this embodiment (as will be seen to be true also for the embodiments of FIGS. 3-6, 8, 10 and 11) the bumper bar can be formed of a non-plastic material, e.g. steel, as many plastic foams adhere well to metal. Foam member with the integral skin 24 absorbs impact forces applied to the bumper in substantially the same manner as described above with respect to FIG. 1.

Figure 3:
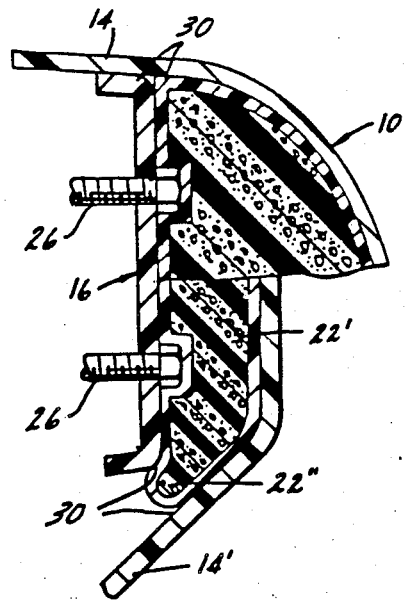

In the bumper illustrated in FIG. 3 flanges 14 of fasica 10 are slidably engaged with the opposite flanged ends of bumper bar 16 so that, upon impact, the fascia as a whole can shift rearwardly relative to the bumper bar. When an impact occurs the form core 22 is compressed as at 22' and the upper and lower portions thereof are extruded outwardly and rearwardly as at 22'. This causes the integral skin 24 adjacent the outwardly flared portions 14' of the fascia to stretch. In order to inhibit tearing of the foam and skin a mold release compound is applied to the inner face of the fascia along the areas designated 30.

In the arrangements illustrated in FIGS. 2 and 3 and in the arrangements hereinafter described the fascia and the back-up member or the bumper bar are held in assembled relation solely by the bond between the integral skin on the foam core and the bumper bar. This reduces considerably the cost of manufacturing and assembling the complete bumper. The construction shown in FIG. 3 can be employed on those vehicles where rearward displacement and vertical flaring of the flanges 14 of the fascia do not interfere with other components of the vehicle frame or body.

Figure 4:
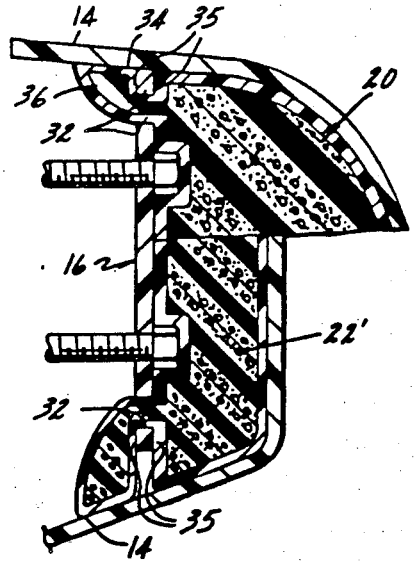

In the arrangement illustrated in FIG. 4 the bumper bar 16 is formed with openings or apertures 32 and the foam member 20 is initially molded so that an extrudate extends through the openings 32 and adheres to the inner faces of flanges 14 as indicated at 34. A release compound is applied to the areas 35 at openings 32. Upon impact the portions 36 of the foam member 20, including the integral skin thereon, become stretched as shown in the lower portion of FIG. 4. This reduces the extent to which the flanges 14 will flare vertically and also increases the amount of energy absorbed upon impact since a portion of this energy is utilized to stretch the portion 36 and the integral skin thereon.

In the case of the exposed surface of the extrudate in the embodiment of FIG. 4, and in other embodiments in which surface portions of the foam are exposed, the exposed areas may be sealed with an elastomeric sealer, such as by spraying or dipping, to make the exposed areas impervious to the entry of water.

Figure 5:
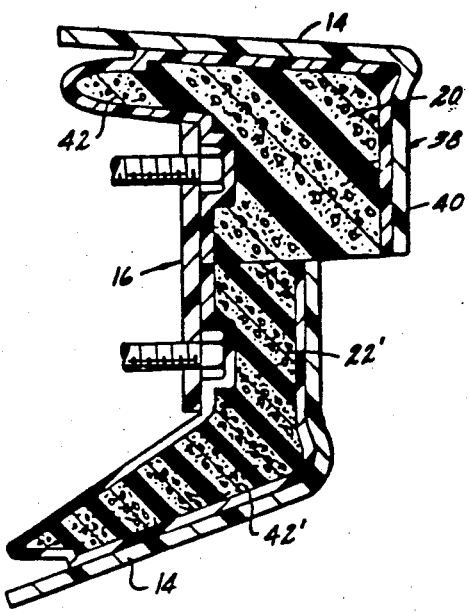

In the event there is a tendency for the skin and foam to shear in the sections 22" of the arrangement shown in FIG. 3, this can be reduced to a large extent by the arrangement shown in FIG. 5. Stated differently, the arrangement shown in FIG. 5 is capable of withstanding a higher impact load without shearing the foam member 20. In the bumper shown in FIG. 5 the fascia 38 has a flat front portion 40, as distinguished from the rounded portion 12 of the fascia 10 illustrated in FIGS. 1 through 4. This difference is merely one of ornamentation and does not affect the energy absorbing properties of the bumper. However, in the bumper shown in FIG. 5 the bumper bar 16 terminates along its upper and lower edges inwardly of the flanges 14 of the fascia and the foam member 20 is molded between the fascia and the bumper bar so that it extends rearwardly beyond the bumper bar 16 along the upper and lower edges thereof as indicated at 42. The vertical spacing between the bumper bar 16 and the flanges 14 tends to minimize vertical displacement of the flanges on impact of the bumper. When the front face of the fascia is subjected to an impact the foam core is compressed as at 22' and the portions 42, together with the integral skin thereon, are stretched into the configuration shown at 42'. As in the previous embodiments described, the presence of the integral skin on the foam core and its adherence to the bumper members absorbs a very substantial portion of the impact energy without damaging the bumper. The tension developed in the core and the integral skin also tends to return the fascia to its original configuration after the impact force is released.

Figure 6:
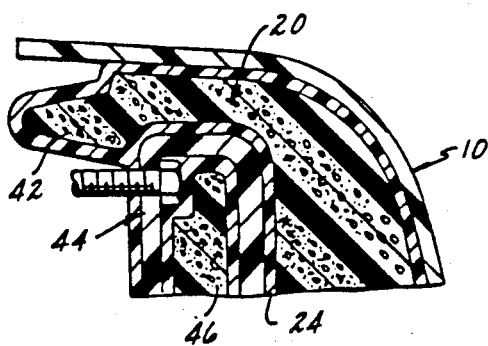
FIGS. 6, 7, 8 and 11 are sectional views showing further modifications of the present invention.

The arrangement shown in FIG. 6 is somewhat similar to that shown in FIG. 5 except that the bumper bar 44 is formed as a hollow member extending substantially the full length of the bumper. Bumper bar 44 can be extruded from a semi-rigid plastic or can be formed from a somewhat resilient sheet material. In either event, the bumper bar has the integral skin foam 46 molded therein simultaneously with the molding of the foam member 20 in the fascia. The integral skin foam 46 may be selected to have different compressibility than the foam 20 as another means of managing the absorption and distribution of impact loads to the fascia 10. Thus, the bumper bar 44 and the fascia 10 are held in assembled relation by the integral skin 24 of the foam member 20. The portions 42 of the foam member 20 which project rearwardly from the upper and lower edges of bumper bar 44 serve the same purpose as the portions 42 illustrated in FIG. 5. The hollow bumper bar increases the section modulus and further enhances the energy absorbing characteristics of the bumper.

Figure 7:
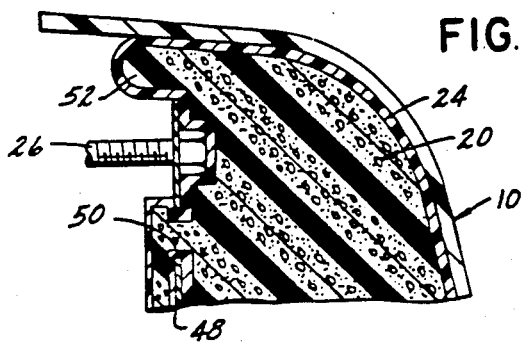

In the arrangement shown in FIG. 7 the bumper bars previously shown and described are replaced by a thin metal tension strap 48 which extends lengthwise of the bumper at least between the two bumper mounting columns or brackets (not shown) on the vehicle frame. The tension strap 48 is formed with a plurality of openings 50 therein and the foam member 20 is molded in situ so that the tension strap 48 is substantially completely embedded in the foam except at the area surrounding the mounting screws 26. As in the arrangements illustrated in FIGS. 5 and 6, the tension strap 48 and the fascia 10 are held together solely by the integral skin 24 on the foam member 20. Likewise, as in FIGS. 5 and 6, foam member 20 extends rearwardly beyond the upper and lower edges of the tension strap 48 as at 52. By encapsulating strap 48 within the foam member 20 a more secure bond between these members is obtained. It may be advantageous to prepare the surface of the strap 48 to enhance adhesion.

Figure 8:
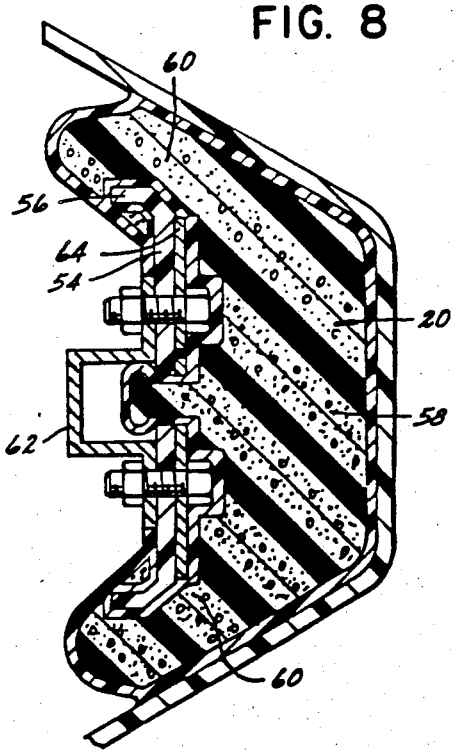

In the bumper illustrated in FIG. 8 the bumper bar 54 is completely embedded in the foam member 20 and the upper and lower edges which are spaced from the flanges of the fascia are inclined rearwardly as at 56. With this arrangement, when the fascia is subjected to an impact force, the vertical central portion 58 of the foam member 20 is subjected to compression, but, at the portions 60 of foam member 20 adjacent the rearwardly inclined portions 56, the forces on the foam member 20 are gradually converted from compression forces to tension forces. Thus, these rearwardly inclined portions avoid an abrupt change from compression to tension forces in the member 20 and further inhibit tearing of the foam at these sections. There is also illustrated in FIG. 8 one of the two mounting columns or brackets 62 on the vehicle frame on which the bumper is mounted. In addition to the bumper bar 54, FIG. 8 shows the use of a separate thin metal tapping plate 64 at each of the two mounting points of the bumper bar on the vehicle frame.

Figure 9:
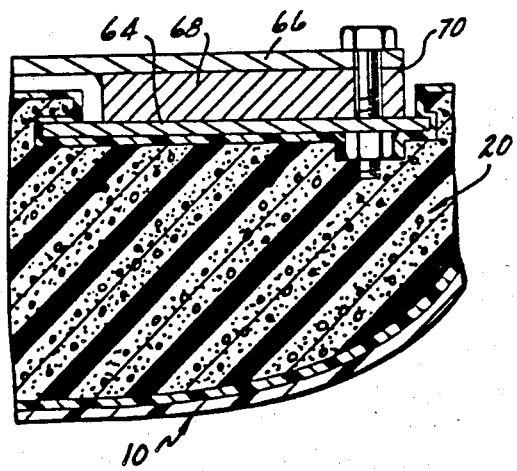
FIG. 9 is a fragmentary horizontal sectional view of another embodiment according to the present invention.

FIG. 9 illustrates a special application of the bumper of the present invention wherein the bumper is adapted for mounting on a vehicle already equipped with a backing member. Specifically, this embodiment utilizes individual metal tapping plates 64 embedded in the foam member 20 and located adjacent each of the mounting brackets for mounting the bumper on the vehicle frame. In this arrangement a metal strap 66 extending between the two bumper mounting brackets on the vehicle frame functions to provide the required backup for compression of the foam 20. The strap 66 has two spacers 68 secured thereto as by welding (as at 70). In this arrangement the bumper itself simply consists of the fascia 10, the foam member 20 and the two tapping plates 64 encapsulated in the foam as illustrated.

Figure 10:
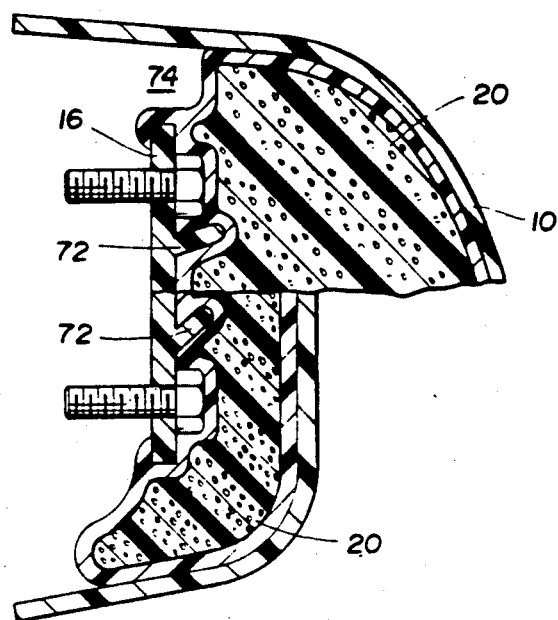

FIG. 10 shows another embodiment of the invention with the added feature of a rib 72 formed integrally with the bumper bar 16. The view also shows the foam 20 forwardly recessed in the area 74 proximate the vertical extreme of the bumper bar.

The rib 72 is formed as an integral extension of the bumper bar 16 to add rigidity. In its relaxed state it can be canted relative to the vertical dimension of the bumper bar to facilitate deflection upon impact of the fascia 10 as shown in FIG. 10.

The recess in area 74 provides another compression and flow pattern for the plastic foam 20 to absorb and distribute impact loads to the fascia 10.

Figure 11:
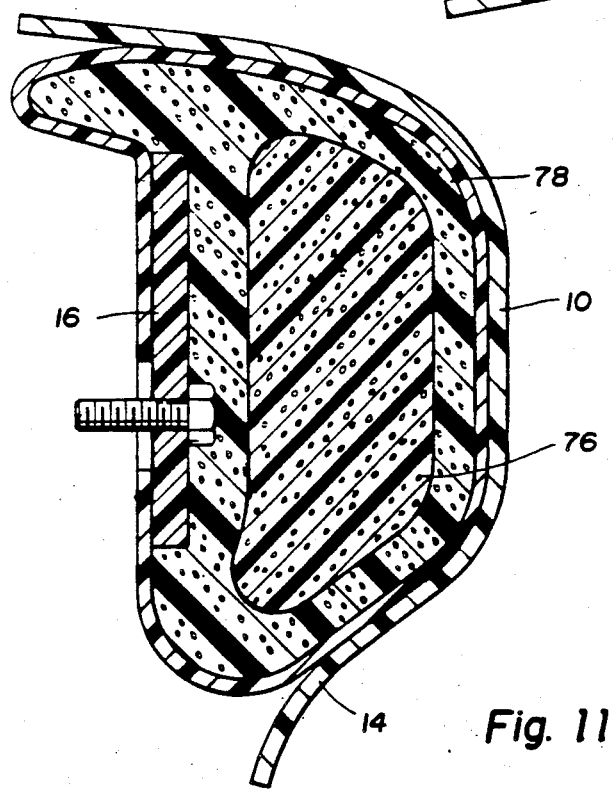

FIG. 11 is a cross-sectional view of another bumper embodiment illustrating two additional features of the present invention. The section or cutting plane line of FIG. 11 is offset at the vertical midpoint of the bumper to show the interruption of foam skin proximate the fastener.

First, the lower flange 14 of the fascia 10 is shown projecting in a generally downward direction forward of the bumper bar 16.

Second, the foam is made of two constituents to give it a cross-section of varying density and rigidity. That is, in the embodiment of FIG. 11, a pre-molded plastic foam bun 76 of one desired density or rigidity is embedded within a foam matrix 78 molded in situ and of another density or rigidity. This feature of varying cross-sectional density of the foam gives added control over the energy management. The invention also contemplates the same result achieved by using a homogenous plastic foam of continuously varying or graduated density across the cross-sectional area of the foam.

The embodiments of the invention in which an exclusive property or privilege is claimed are defined as follows:

1. A vehicle bumper, comprising: a fascia having a front portion adapted to receive impact forces and upper and lower flanges extending rearwardly from said portion;

a backing member positioned rearwardly of the front portion of the fascia and extending vertically relative to said upper and lower flanges in spaced relation therebetween, said member including means for mounting the bumper on the vehicle;

a resiliently compressible plastic foam molded in situ in at least the volume bounded by the backing member and the fascia and extending rearwardly through at least one of the spaces between the backing member and the upper and lower flanges, said foam having an integral skin bonded to adjacent surfaces of the backing member and the fascia.

2. The vehicle bumper as defined in claim 1 wherein the plastic foam is an integral skin polyurethane foam.

3. The vehicle bumper as defined in claim 1 wherein the fascia and the backing member are formed.

4. The vehicle bumper as defined in claim 1 wherein the fascia and the backing member are plastic members.

5. The vehicle bumper as defined in claim 4 wherein the fascia and the backing member are injection molded plastic members.

6. The vehicle bumper as defined in claim 1 wherein the bumper is bound as a unitary assembly solely by the adhesion of the integral foam skin to the fascia and backing member.

7. The vehicle bumper as defined in claim 1 wherein the backing member includes at least one integral rib to add rigidity to the backing member.

8. The vehicle bumper as defined in claim 7 wherein the rib is canted in its relaxed state relative to the vertical dimension of the backing member to facilitate deflection upon impact of the fascia.

9. The vehicle bumper as defined in claim 1 wherein the plastic foam has a varying density within its cross sectional area.

10. The vehicle bumper as defined in claim 1 wherein the backing member is formed of metal.

* * * * *